United States Patent Office 3,158,356
Patented Nov. 24, 1964

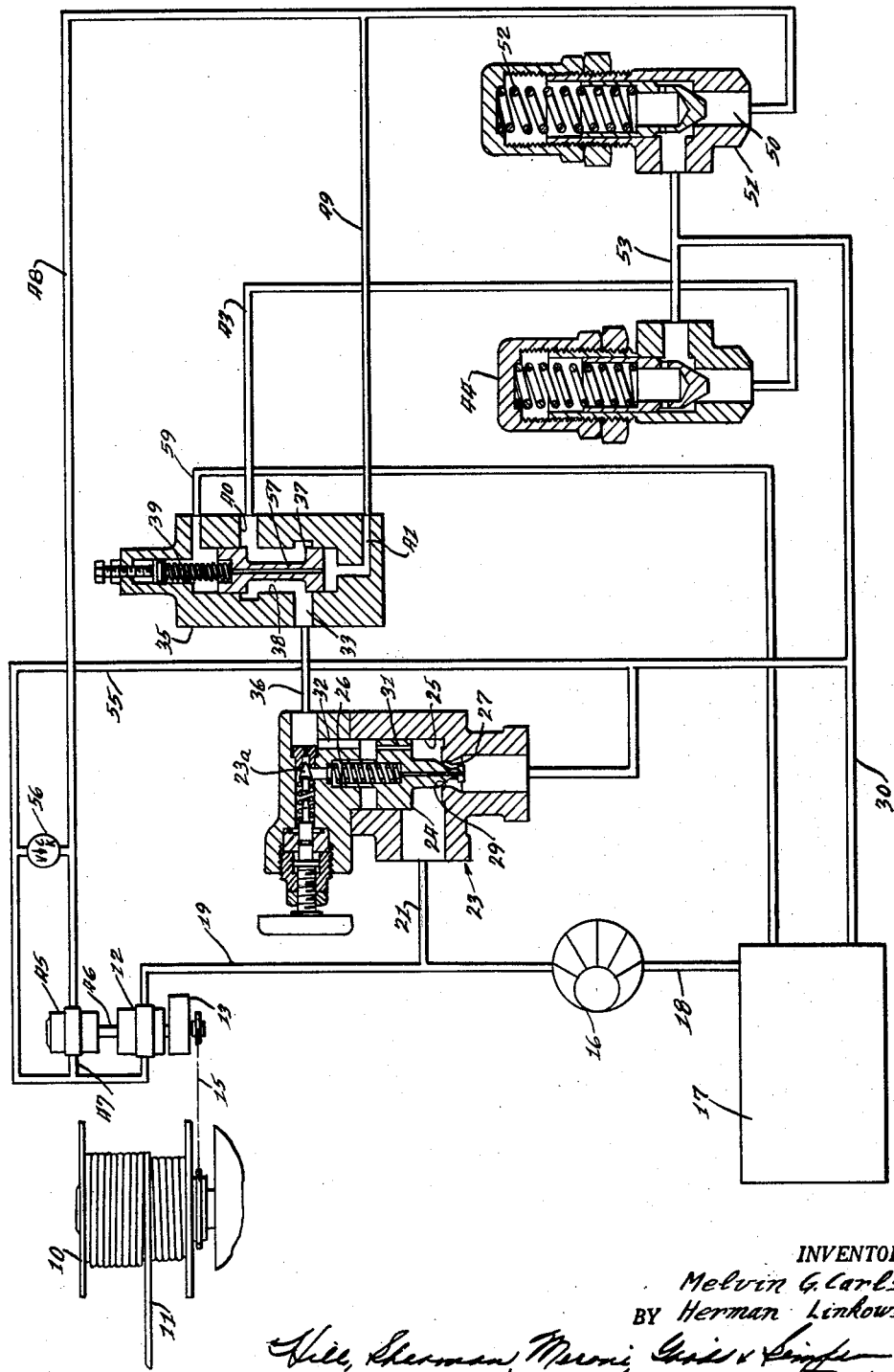

3,158,356
AUTOMATIC REGULATOR FOR CABLE REEL
Melvin G. Carlson, Oak Lawn, and Herman Linkowski,
 Chicago, Ill., assignors to Goodman Manufacturing
 Company, Chicago, Ill., a corporation of Illinois
Filed Feb. 23, 1962, Ser. No. 175,095
11 Claims. (Cl. 254—173)

This invention relates to improvements in cable reels supplying electric power to vehicles and more particularly relates to an improved form of drive for a cable reel and control means therefor, providing the proper tension on the cable during reeling and unreeling of the cable.

Heretofore, cable reels, reeling and unreeling cable, supplying electrical power to mine vehicles, such as shuttle cars, have been driven by fluid pressure operated motors operating at comparatively low pressures, the pressure being sufficient to maintain the desired tension on the cable during reeling and unreeling of the cable.

The pressure in the hydraulic system for operating the cable reel has been governed to provide greater torque requirements to the reel as the mine vehicle advances toward the power source, and lesser torque on the cable reel drive motor as the cable is unspooled, as the mine vehicle travels away from the power source.

A shuttle valve having a movable valve spool member therein, shiftable in response to the change in direction of flow through the cable reel drive motor, has heretofore been used to govern the pressure in the hydraulic drive system and reduce the pressure in the hydraulic drive system for the reel as cable is paid off its cable reel. Movement of the shuttle valve spool to its low pressure position, however, has been dependent upon the developing of a vacuum in the fluid motor return line effecting operation of the shuttle valve, during unspooling of the cable as the cable reel drives its drive motor as a pump and also on leakage through the motor to re-establish the winding pressure.

While the use of such shuttle valves, positioned by the discharge flow from the fluid motor for winding and by the vacuum developed in the discharge line when unwinding, has operated satisfactorily for low capacity cable reels, with the larger capacity vehicles requiring more horsepower and heavier trailing cable, the torque requirements to take up the cable have been materially increased with the result that the pressure setting of the hydraulic system must also be increased.

Where the higher pressures are used, however, the reel motor when driven by the cable reel and acting as a pump leaks more fluid to the return line, which is then a suction line, with the result that sufficient vacuum to shift the valve spool of the shuttle valve to the low pressure positions cannot be developed by the reel drive motor.

This causes the electrical cable to unspool at the high pressure setting used for winding with the resultant overtensioning of the cable and the shortening of the life of the fluid motor due to cavitation and also causes excess heating of the hydraulic fluid, reducing its viscosity and compounding leakage.

A principal object of the invention, therefore, is to remedy the foregoing deficiencies by providing an improved form of fluid motor drive to a cable reel having a simple and effective means for establishing a desired tension during reeling and unreeling of the cable.

Another object of the invention is to provide a simple and improved form of hydraulic system for driving a cable reel, in which a considerably higher pressure is established during reeling than during unreeling of the cable.

Still another object of the invention is to provide a novel form of fluid motor drive to a cable reel, together with a simplified form of control system therefor, supplying a relatively high pressure to the fluid motor when taking up cable, and providing a substantially lower back pressure on the motor when paying out cable.

Still another object of the invention is to establish a desired tension on a cable paid out or wound on a cable reel by the use of a motor driven as a pump by the cable, as cable is paid off the reel, and by utilizing the motor when driven as a pump to actuate a shuttle control valve providing a low pressure relief setting in the fluid pressure reel drive system, as cable is paid off the reel.

These and other objects of the invention will appear from time to time as the following specification proceeds and with reference to the accompanying drawing, wherein the figure is a diagrammatic view diagrammatically showing a form of fluid circuit arranged in accordance with the principles of the present invention.

In the embodiment of the invention illustrated in the drawing, we have shown a cable reel 10 having an electric cable 11 wound thereon and connected at its free end to a suitable source of electric power, to supply electric power to a vehicle, which may be a vehicle of a type operating underground in mines, such as a shuttle car, electric mine locomotive and the like.

While we have herein shown the fluid circuit of the present invention as applied to drive a cable reel and maintain the required tension on the cable during the reeling and unreeling operations, the circuit of the invention need not necessarily be applied to drive a cable reel, but may be applied to various tensioning devices in which it is advantageous to provide a relatively high pressure while taking up on a member, and lower pressure when paying out the member.

The cable reel 10 may be of a conventional form and is no part of the present invention so need not herein be shown or described further, except to point out that it is driven by a fluid motor 12, driving a speed reducer 13 having driving connection with the cable reel 10, through a chain and sprocket drive 15.

A pump 16 connected with a fluid storage tank 17 through an intake line 18 is provided to supply fluid under pressure to the motor 12 through a pressure line 19. The pump 16 has a greater capacity than the capacity of the motor 12 and returns excess fluid back to tank through a by-pass line 21 connected with a high pressure relief valve 23. The high pressure relief valve 23 may be a conventional type of relief valve having a balanced piston 24 movable along a chamber 25 against a spring 26, upon the application of fluid under pressure thereto. The piston 24 has a valve 27 connected thereto and cooperating with a port 29, to relieve pressure from the pressure line 19 and return fluid back to the tank 17 through a return line 30.

The piston 24 also has a balancing passageway 31 leading therethrough to effect the balancing of the pressure on opposite sides of said piston. The opposite side of the piston 24 from the valve 29 is connected with a passageway 32 connected with relief inlet 33 of a shuttle valve 35, through a pressure line 36 in communication with the seat for a control poppet valve 23a controlling the setting of the relief valve 23.

The shuttle valve 35 is shown as being a spool type of shuttle valve having a valve spool 37 movable along a valve chamber 38 and biased by a spring 39 to block the flow of fluid through an outlet 40 of said shuttle valve. When the outlet 40 is blocked, the pressure on opposite sides of piston 24 of the relief valve 23 will be balanced and the control poppet valve 23a will open. The relief valve 23 will then only relieve pressure through the port 29 to the return line 30 at the high pressure setting of the valve, which may be 700 p.s.i., or as high as the capability of the pump required to supply the required winding torque.

A pressure passageway 41 leads into the body of the shuttle valve 35 to supply fluid under pressure to the opposite end of the spool 37 from the spring 39 and to move said spool into the position shown in the drawing, to accommodate the flow of fluid from the high pressure relief valve through the pressure line 36, inlet 33 and out through the outlet 40 and passageway 43, to a low pressure relief valve 4. Movement of the valve piston 37 against the spring 39 to acommodate the passage of fluid through the outlet 40 of the shuttle valve 35 will thus unbalance the relief valve piston 24 and permit the relief valve to return hydraulic fluid back to the tank 17 through the return line 30.

Opening of the shuttle valve 35 and unbalancing of the piston 24 of the relief valve 23 thus accommodates said relief valve to open and return fluid back to the tank 17, at a substantially lower pressure than the high pressure setting of said relief valve, which for example, may be 150 p.s.i. The relief valve 23 thus serves as a high pressure relief valve during the winding of the cable 11 on the reel 10, and serves as a low pressure relief valve upon shifting of the spool 37 of the shuttle valve 35 to accommodate the unbalancing of pressure on the piston 24, as shown in the figure of the drawing.

The means for supplying fluid under pressure to shift the valve spool 37 into position to unbalance the relief valve piston 24 is herein shown as comprising a fluid pressure operated motor 45 connected in tandem with the motor 12 through a shaft 46. The motor 45 is driven as a pump by the shaft 46 as cable is paid off the cable reel 10 and has fluid communication with the outlet side of the fluid motor 12, through a fluid line 47. The opposite side of the fluid pressure motor 45 has connection with the pressure passageway 41 through a pressure line 48 and a branch pressure line 49. The pressure line 48 is in turn connected with a pressure inlet 50 of a low pressure relief valve 51. The low pressure relief valve 51 is loaded by a spring 52 to provide sufficient pressure in the pressure line 49 and pasageway 41 to move the shuttle valve spool 37 against its spring 39 into position to unbalance pressure on the relief valve piston 24, as shown in the figure of the drawing.

The return side of the relief valve 51 is connected with the return side of the relief valve 44 through a return line 53 having communication with the return line 30 and return fluid back to the tank 17 upon the opening of either of the relief valves 44 or 51.

As the mine vehicle or shuttle car moves toward the point of connection of the cable 11 to a source of power, the motor 12 will drive the cable reel 10 in a winding direction to wind cable on said reel. The motor 45 will then draw hydraulic fluid through its intake through a line 55 and check valve 56, connecting said line with the line 48. Hydraulic fluid will thus be drawn directly from the tank line 55, but little or no pressure will be developed during the winding operation of the cable reel 10.

As the mine vehicle is moving away from its source of power and cable is paid off the cable reel, the tandem fluid motors 12 and 45 will be driven by the cable reel as pumps. The motor 45 will deliver fluid under pressure to the pressure line 48 at a pressure regulated by the relief valve 51, which may be 150 p.s.i. This will supply fluid under pressure through the pilot line 49 to shift the shuttle valve spool 37 and open the passageway 36 to the passageway 43 connected with the low pressure relief valve 44, which in the present instance may be set to relieve pressure from the pressure line 43 at a pressure of 150 p.s.i. The passageway 32 will now be open to low pressure and the relief valve piston 24 will be unbalanced and the volume of hydraulic fluid produced by the pump 16 and the motor 12 driven as a pump will be by-passed back to the tank 17 through the high pressure relief valve 23, at a relatively low pressure of substantially 150 p.s.i.

As the mine vehicle stops and the unreeling of the cable 11 ceases, the auxiliary motor 45 will stop and the flow of fluid under pressure through the pilot line 49 will stop. The shuttle valve piston 37 has a small bleed hole 57 leading along the center thereof and opening to opposite ends thereof. This will allow the hydraulic fluid in the pilot line 49 and the passageway 41 to escape to tank through a return line 59. The spring 39 will then shift the shuttle valve spool 37 to block the passageway 40 and retain fluid from passing through the passageway 36 and again balance the relief valve piston 24 to operate at the high pressure setting of said relief valve.

It may be seen from the foregoing that a simplified fluid pressure system and drive to a cable reel has been provided, driving the cable reel at a relatively high torque when winding cable on the reel, as the reel is moving toward the point of connection of the cable to a source of power, and maintaining a relatively low torque on the cable reel as the reel is paying off cable as the vehicle on which it is mounted moves away from the source of power to provide a substantially uniform tension on the cable during winding in and paying out of the cable, and that this is attained by the unbalancing of pressure on a single high pressure relief valve by fluid pressure attained by driving an auxiliary motor by the cable reel as a pump, accommodating the relief valve to serve as a high pressure relief as the cable is wound on the cable reel, and as a low pressure relief valve as cable is paid off the reel.

It may further be seen that the control of the relief valve is attained by a shuttle valve operated by fluid pressure built up by the auxiliary motor driven as a pump, and maintained by a low pressure relief valve loaded to the low pressure torque on the reel for unwinding cable therefrom.

While we have herein shown and described one form in which our invention may be embodied, it may readily be understood that various variations and modifications in the invention may be attained without departing from the spirit and scope of the novel concepts thereof, as defined by the claims appended hereto.

We claim as our invention:

1. In a fluid pressure system for maintaining a substantially uniform tension on a member, as the member is drawn in and paid out,
    (a) a fluid pressure motor providing the power to effect the drawing in of the member, said motor being driven by the member as a pump during paying out of the member and supplying the driving torque to draw in the member,
    (b) a second fluid pressure motor driven as a pump during paying out of the member,
    (c) a pump supplying fluid under pressure to said first motor,
    (d) a relief valve between said pump and said first motor by-passing fluid under pressure from said first motor,
    (e) and valve means connected with said relief valve and operated by pressure generated by said second motor when operating as a pump, for reducing the pressure of opening of said relief valve to provide a reduced back pressure to said first motor when driven as a pump.

2. In a fluid pressure system controlling the drawing in and paying out a flexible member,
    (a) a first motor supplying the power to draw in the member, said motor being driven as a pump during paying out the member,
    (b) a second fluid pressure motor in tandem with said first motor, said second motor being driven by said first motor as a pump during paying out of the member and supplying the pressure to control the resistance to rotation of said first motor when driven as a pump,
    (c) a pump supplying fluid under pressure to said first motor,
    (d) a relief valve connected between said pump and said first motor, to by-pass surplus fluid from said first motor, (e) and a shuttle valve operated by said second motor when driven as a pump, relieving the resistance to opening of said relief valve and accommodating opening of said relief valve at a substantially lower pressure than the setting of said relief valve.

3. In a fluid pressure system controlling the drawing in and paying out a flexible member and maintaining a substantially uniform tension on the member when being paid out and drawn in, (a) a first fluid pressure motor supplying the torque to draw in the member, said motor being driven by the member as a pump as the member is paid out, (b) a second fluid pressure motor in tandem with said first motor, said second motor being driven as a pump as the member is paid out and supplying the pressure to control the resistance to rotation of said first motor when driven as a pump, (c) a pump supplying fluid under pressure to said first motor, (d) a high pressure relief valve by-passing fluid from said first motor, (e) a shuttle valve operated by pressure supplied by said second motor when driven as a pump, and reducing the resistance to operation of said relief valve and accommodating operation of said relief valve at a lower pressure than the setting of said valve, (f) and a low pressure relief valve controlling the pressure delivered by said second motor when driven as a pump and providing the pressure to effect operation of said shuttle valve.

4. In a fluid pressure system controlling the drawing in and paying out of a flexible member and maintaining predetermined tensions on the member during paying out and drawing in of the member, (a) a first fluid pressure motor supplying the torque to draw in the member, (b) a second fluid pressure motor, said second motor being driven as a pump during paying out of the member and supplying the pressure to control rotation of said first motor when driven as a pump, (c) a pump supplying fluid under pressure to said first motor and having a greater capacity than the capacity of said first motor, (d) a high pressure relief valve relieving excess fluid from said pump, (e) means balancing said relief valve to operate at a predetermined high pressure, (f) a shuttle valve for unbalancing said relief valve and accommodating the opening of said valve at a predetermined lower pressure, (g) a pressure line from said second motor to said shuttle valve for operating said shuttle valve to unbalance said relief valve, (h) and a lower pressure relief valve in said pressure line and building up pressure therein to effect operation of said shuttle valve to reduce the pressure of operation of said relief valve.

5. In a fluid pressure system controlling the drawing in and paying out of a flexible member and maintaining predetermined tensions on the member, (a) a first fluid pressure motor supplying the torque to draw in the member, (b) a second fluid pressure motor, said second motor being driven as a pump during paying out of the member and supplying the pressure to control rotation of said first motor when driven as a pump, (c) a pump supplying fluid under pressure to said first motor and having a greater capacity than the capacity of said first motor, (d) a high pressure relief valve relieving excess fluid from said pump, (e) means balancing said relief valve to operate at a predetermined high pressure, (f) a shuttle valve for unbalancing said relief valve and accommodating the opening of said valve at a predetermined lower pressure, (g) a pressure line from said second motor to said shuttle valve for operating said shuttle valve to unbalance said relief valve, (h) a low pressure relief valve connected with said pressure line and building up pressure therein to effect operation of said shuttle valve, (i) a return line leading from said shuttle valve, (j) and a low pressure relief valve in said return line governing the low pressure operation of said relief valve.

6. In a cable reeling mechanism, (a) a reel, (b) a first fluid pressure motor for driving said reel, (c) a second fluid pressure motor driven as a pump during the paying out of cable from the reel, (d) a pump of greater capacity than the capacity of said first motor for supplying fluid under pressure to operate said motor, a relief valve relieving excess fluid from said first motor, (e) and a shuttle valve operated by fluid under pressure supplied by said second motor when driven as a pump and effecting the operation of said relief valve at a predetermined pressure, lower than the setting of said relief valve.

7. In a cable reeling mechanism, (a) a reel, (b) a first fluid pressure motor for driving said reel, (c) a second fluid pressure motor driven as a pump during the paying out of cable from the reel, (d) a pump of greater capacity than the capacity of said first motor for supplying fluid under pressure to operate said motor, a relief valve relieving excess fluid from said first motor, (e) a shuttle valve operated by fluid under pressure supplied by said second motor when driven as a pump and effecting the operation of said relief valve at a predetermined pressure, lower than the setting of said relief valve, (f) and a low pressure relief valve building up sufficient back pressure on the second motor when operating as a pump to effect operation of said shuttle valve.

8. In a cable reeling mechanism, (a) a reel, (b) a first fluid pressure motor for driving said reel, (c) a second fluid pressure motor driven as a pump during the paying out of cable from the reel, (d) a pump of greater capacity than the capacity of said first motor for supplying fluid under pressure to operate said motor, a relief valve relieving excess fluid from said first motor, (e) a shuttle valve operated by fluid under pressure supplied by said second motor when driven as a pump and effecting the operation of said relief valve at a predetermined pressure, lower than the setting of said relief valve, (f) a low pressure relief valve building up sufficient back pressure on the second motor when operating as a pump to effect operation of said shuttle valve, (g) and a second low pressure relief valve in series with the outlet from said shuttle valve and determining the pressure of operation of said relief valve.

9. In a fluid pressure system particularly adapted for operating cable reels and the like and maintaining tension on the cable during drawing in and paying out of the cable, (a) a first fluid pressure motor supplying the torque to wind in cable on the reel, (b) a second fluid pressure motor in tandem with said first motor and driven by the reel when operating in an unreeling direction, (c) a pump having a greater capacity than the capacity of said first fluid pressure motor and supplying fluid under pressure to said first fluid pressure motor, (d) a relief valve connected between said pump and said first fluid pressure motor and bypassing excess fluid from said pump, (e) said relief valve including a piston balanced to operate at a predetermined high pressure, and means unbalancing said piston to reduce the pressure of operation of said relief valve comprising, (f) a shuttle valve having fluid communication with said relief valve and operable to unbalance said piston to effect operation of said relief valve at a predetermined low pressure, (g) a pressure line leading from said second motor to said shuttle valve for operating said shuttle valve when said second motor is driven as a pump, (h) and a low pressure relief valve connected with said pressure line for building up pressure therein to effect operation of said shuttle valve to unbalance said piston at a predetermined low pressure.

10. In a fluid pressure system particularly adapted for operating cable reels and the like and maintaining predetermined desired tensions on the cable during drawing in and paying out of the cable.

(a) a first fluid pressure motor supplying the torque to wind in cable on the reel, (b) a second fluid pressure motor in tandem with said first motor and driven by the reel as a pump when operating in an unreeling direction, (c) a pump supplying fluid under pressure to said first motor, the capacity of said pump being greater than the capacity of said first motor, (d) a relief valve by-passing excess fluid from said pump, (e) said relief valve including a piston balanced to operate at a predetermined high pressure, and means unbalancing said piston to reduce the pressure of operation of said relief valve comprising, (f) a shuttle valve having (g) a relief inlet connected with said relief valve, (h) an outlet returning fluid to tank, (i) a piston biased to close said outlet and maintain a predetermined pressure balance on said relief valve, (j) a pressure line leading from said second motor to said shuttle valve to effect operation of said piston by the pressure developed by said second motor when operating as a pump, to open said outlet and unbalance said relief valve piston, (k) and a low pressure relief valve in said pressure line leading from said second motor, effecting the building up of pressure in said pressure line, to effect operation of said shuttle valve to unbalance said relief valve piston and to thereby reduce the resistance to rotation of said first motor when driven as a pump and reduce the tension on the cable when being paid off the reel.

11. In a fluid pressure system particularly adapted for operating cable reels and the like and maintaining tension on the cable during drawing in and paying out of the cable, (a) first fluid pressure motor supplying the torque to wind in cable on the reel, (b) a second fluid pressure motor in tandem with said first motor and driven by the reel as a pump when operating in an unreeling direction, (c) a pump supplying fluid under pressure to said first motor and having a greater capacity than the capacity of said first motor, (d) a relief valve by-passing excess fluid from said pump, (e) said relief valve including a piston balanced to operate at a predetermined high pressure, and means unbalancing said piston to reduce the pressure of operation of said relief valve comprising, (f) a shuttle valve having (g) a relief inlet connected with said relief valve, (h) an outlet returning fluid to tank, (i) a piston biased to close said outlet and maintain a predetermined pressure balance on said shuttle valve, (j) a pressure line leading from said second motor to said shuttle valve to effect operation of said piston by the pressure developed by said second motor when operating as a pump, to open said outlet and unbalance said relief valve piston, (k) a low pressure relief valve in said pressure line leading from said second motor, effecting the building up of pressure in said pressure line, to effect operation of said shuttle valve, (l) and a second low pressure relief valve connected with said outlet from said shuttle valve and building up pressure therein, and determining the pressure of operation of said relief valve during the paying out of cable from the cable reel.

References Cited in the file of this patent
UNITED STATES PATENTS

| | | |
|---|---|---|
| 2,267,177 | Twyman | Dec. 23, 1941 |
| 2,388,820 | Bonnell | Nov. 13, 1945 |
| 2,670,153 | Hair | Feb. 23, 1954 |
| 2,818,706 | Wright | Jan. 7, 1958 |
| 2,923,306 | Mitchell | Feb. 2, 1960 |